United States Patent
Corbalán Pelegrín et al.

(10) Patent No.: US 12,326,496 B2
(45) Date of Patent: Jun. 10, 2025

(54) ULTRA-WIDE BAND DISTANCE DETERMINATION WITH AN ANGLE-OF-ARRIVAL BASED DISTURBANCE COMPENSATION

(71) Applicant: NXP B.V., Eindhoven (NL)

(72) Inventors: Pablo Corbalán Pelegrín, Callosa de Segura (ES); Michael Schober, Graz (AT); David Veit, Graz (AT)

(73) Assignee: NXP B.V., Eindhove (NL)

( * ) Notice: Subject to any disclaimer, the term of this patent is extended or adjusted under 35 U.S.C. 154(b) by 332 days.

(21) Appl. No.: 17/814,903

(22) Filed: Jul. 26, 2022

(65) Prior Publication Data
US 2023/0052581 A1 Feb. 16, 2023

(30) Foreign Application Priority Data

Aug. 16, 2021 (EP) .................................. 21191543

(51) Int. Cl.
*G01S 13/02* (2006.01)
*G01S 13/48* (2006.01)

(52) U.S. Cl.
CPC .......... *G01S 13/0209* (2013.01); *G01S 13/48* (2013.01)

(58) Field of Classification Search
CPC ........ G01S 13/0209; G01S 13/48; G01S 3/46; G01S 5/12; G01S 3/023
See application file for complete search history.

(56) References Cited

U.S. PATENT DOCUMENTS

| | | | |
|---|---|---|---|
| 7,577,464 B2 * | 8/2009 | Ezal | H01Q 21/29 342/149 |
| 8,265,011 B2 * | 9/2012 | Sugar | G01S 5/02213 455/456.2 |
| 10,064,148 B2 | 8/2018 | Xia | |
| 2017/0242092 A1 * | 8/2017 | Marquez | G01S 3/46 |
| 2020/0041603 A1 * | 2/2020 | Stephens | G01S 5/12 |
| 2020/0411986 A1 * | 12/2020 | Cooper | H01Q 9/0421 |
| 2021/0159938 A1 * | 5/2021 | Subraveti | H04W 56/0015 |
| 2022/0303680 A1 * | 9/2022 | Ahmed | H04W 76/14 |

FOREIGN PATENT DOCUMENTS

| | | | | |
|---|---|---|---|---|
| CN | 105547297 A | | 5/2016 | |
| WO | WO-2018234533 A1 * | 12/2018 | ............. H01Q 1/523 |

OTHER PUBLICATIONS

Machine translation of description for CN 105547297 A. (Year: 2016).*

(Continued)

*Primary Examiner* — Whitney Moore

(57) ABSTRACT

There is described a ultra-wide band (UWB) communication device, comprising:
i) a UWB antenna, configured to receive a UWB signal from a further UWB communication device, and
ii) a control device, configured to
iia) determine an angle of arrival ($\beta$) based on the received UWB signal,
iib) determine a distance between the UWB communication device and the further UWB communication device, and thereby
iic) compensate for a distance determination disturbance using the determined angle of arrival ($\beta$).
Further, a UWB communication system and a method of determining a distance are described.

13 Claims, 2 Drawing Sheets

(56) References Cited

OTHER PUBLICATIONS

Machine translation of description for CN 108152792 A. (Year: 2018).*

Decawave; APS014 Application Note: Antenna Delay Calibration of DW1000-Based Products and Systems; Version 1.2, Jul. 31, 2018.

Dotlic, Igor et al.; "Angle of Arrival Estimation Using Decawave DW1000 Integrated Circuits"; 2017 14th Workshop on Positioning, Navigation and Communications (WPNC); Oct. 25-26, 2017, Bremen, Germany; DOI: 10.1109/WPNC.2017.8250079.

Gerok, Waldemar et al.; "Influence of the real UWB antennas on the AoA estimation based on the TDoA localization technique"; IEEE Middle East Conference on Antennas and Propagation (MECAP 2010); Oct. 20-22, 2010, Ciaro, Egypt; DOI: 10.1109/MECAP.2010.5724210.

Ledergerber, Anton et al.; "Ultra-Wideband Angle of Arrival Estimation Based on Angle-Dependent Antenna Transfer Function"; MDPI Sensors 2019, 19(20), 4466; https://doi.org/10.3390/s19204466; Published Oct. 15, 2019.

Malik, Wasim Q. et al.; "Ultrawideband Antenna Distortion Compensation"; IEEE Transactions on Antennas and Propagation ( vol. 56, Issue: 7, Jul. 2008); Published Jul. 9, 2008; Doi: 10.1109/TAP.2008.924690.

2-VEIT, David et al.; "Impact of UWB Antennas on Ranging Accuracy"; 2020 14th European Conference on Antennas and Propagation (EuCAP); Mar. 15-20, 2020, Copenhagen, Denmark; DOI: 10.23919/EuCAP48036.2020.9135732.

Veit, David; "Characterization, Verification and Optimization of Ultra-Wideband Impulse Radion Ranging Systems"; Doctoral Thesis submitted to Graz University of Technology, Institute of Microwave and Photonic Engineering; Aug. 2020; pp. 1-106; Graz, Austria.

Veit, David; "Characterization, Verification and Optimization of Ultra-Wideband Impulse Radion Ranging Systems"; Doctoral Thesis submitted to Graz University of Technology, Institute of Microwave and Photonic Engineering; Aug. 2020; pp. Title, ii, 5-10, 22, 24-33, 40-41 (sections Abstract, 2.1-2.2.2, 3.1.6, 3.2-3.2.3, 3.6); Graz, Austria.

* cited by examiner

ULTRA-WIDE BAND DISTANCE DETERMINATION WITH AN ANGLE-OF-ARRIVAL BASED DISTURBANCE COMPENSATION

CROSS-REFERENCE TO RELATED APPLICATIONS

This application claims priority under 35 U.S.C. § 119 to European Patent Application No. 21191543.4, filed on Aug. 16, 2021, the contents of which are incorporated by reference herein.

TECHNICAL FIELD

The present disclosure relates to an ultra-wide band (UWB) communication device. The disclosure further relates to a UWB communication system that comprises the UWB communication device. Further, the disclosure relates to a method of determining a distance in a UWB communication system. Thus, the present disclosure may refer to the technical field of radio frequency communication, in particular UWB communication.

TECHNICAL BACKGROUND

Radio frequency (RF) ranging systems can be used for measuring the range (distance) between objects, for example between a tag (such as a mobile phone or a key) and one or more anchors (e.g. a beacon). These ranging systems can be based on Time-of-Arrival (ToA) principles to determine the distance between the devices, such as between anchor and tag. For example, a transmitter of a first device sends out a signal, which is received by a second device. Based on the amount of time that it takes for the signal to reach the receiver of the second device, the distance between the objects (and hence the position) can be calculated. In specific applications, a UWB system can be used.

The term "UWB" may refer to a radio technology that can use a very low energy level for short-range, high-bandwidth communications over a large portion of the radio spectrum. UWB may refer to a technology for transmitting information spread over a large bandwidth (>500 MHz). UWB may be defined as an antenna transmission for which emitted signal bandwidth exceeds the lesser of 500 MHz or 20% of the arithmetic center frequency. UWB transmissions may transmit information by generating radio energy at specific time intervals and occupying a large bandwidth, thus enabling pulse-position or time modulation. The range of UWB may be for example in the range of tens of meters. A UWB distance determination system may employ the Time-of-Arrival principle to determine the distance between UWB communication devices such as a mobile device and anchor devices (on a target device).

However, time-based distance determination measurements, such a time of flight (ToF) and time-difference of arrival (TDoA), from UWB ranging (distance determination) exchanges may suffer from disturbances such as an angle-dependent antenna group delay or antenna imperfections. These disturbances may result in distance/position estimation errors, depending on the relative angle between a transmitting antenna and a receiving antenna. Highly accurate distance estimates, e.g., for robot navigation in harsh environments, may be prevented by these disturbances.

UWB distance determination, e.g. by two-way ranging (TWR), estimates the distance between devices by measuring e.g. the ToF. Disturbances, such as the angle dependent group delay, have a direct impact on the measured (and thus also the determined) distance. The impact of the signal angle of arrival $\beta$ at two positions (the second device is moving from a first position to a second position) may be shown in the following equations (see also FIG. 1):
measured_distance_pos1=distance1+f($\beta$1) and
measured_distance_pos2=distance2+f($\beta$2).

However, since f($\beta$1)≠f($\beta$2), conventional compensation methods may lead to large errors depending on the angle dependent antenna delay. For instance, if the antenna delay estimated at pos1 (under the signal angle $\beta$1) is 0.5 m and the antenna delay at pos2 (under the signal angle $\beta$2) is −0.5 m, the distance measurement error at pos 2 is then 1 m, which might be unacceptable for use cases that require accurate and robust distance estimation between devices. In real-word scenarios, both devices may show this angle-dependent antenna delay, i.e., the antenna delays of ant1 and ant2 add up on each other, leading to larger distance estimation errors. Even for well-designed antennas in free space, the distance determination may be significantly impacted by disturbances such as the angle dependent group delay of the antenna.

OBJECT AND SUMMARY OF THE DISCLOSURE

It is an object of the present disclosure to provide a robust and reliable distance determination in a UWB communication system.

In order to achieve the object defined above, a device, a system, a method and a use according to the independent claims are provided.

According to an aspect of the present disclosure, there is described an ultra-wide band (UWB) communication device comprising:
  i) a UWB antenna, configured to receive a UWB signal, in particular from a further UWB communication device (one way or two way), and
  ii) a control device (e.g. an integrated circuit), configured to
    a) determine an angle of arrival (in particular the azimuth and elevation angle of the received/incoming signal) based on the received UWB signal,
    b) determine a distance (a distance may also be derived from a distance difference in this context) between the UWB communication device and the further UWB communication device (e.g. by ToF or TDoA), and thereby
    c) compensate (correct, calibrate) for a distance determination disturbance using the (at least one) determined angle of arrival.

According to a further aspect of the present disclosure, there is described a UWB communication system, comprising:
  i) a UWB communication device as described above, and
  ii) the further UWB communication device which comprises a further antenna.

According to a further aspect of the present disclosure, there is described a method of determining a distance in a UWB communication system of a UWB communication device with a first antenna and a further UWB communication device with a further antenna, the method comprising:
  i) transmitting a UWB signal between the UWB communication device and the further UWB communication device (one way or two way),
  ii) determining an angle of arrival based on the transmitted UWB signal, iii) determining a distance between the UWB communication device and the further UWB communication device, and thereby iv) compensating for a distance determination disturbance using the determined angle of arrival.

According to a further aspect of the present disclosure, there is described a use (method of using) of a determined angle of arrival (in particular two or more) to compensate for a distance determination disturbance (such as antenna imperfections and/or delays) in a UWB communication system.

In the context of the present disclosure, the term "UWB communication device" may in particular refer to a device that is enabled to interact with communication via radio frequency RF, in particular using ultra-wide band (UWB). The term "UWB communication device" may for example refer to an IC, a tag (IC and antenna), a mobile phone, a token, a key, a smart card, etc. with a UWB functionality.

In the context of the present disclosure, the term "angle of arrival" may in particular refer to the direction of propagation of a radio-frequency wave (UWB) incident on an antenna. The angle of arrival may be specified by the azimuth and elevation of the incoming (received) UWB signal. Said azimuth and elevation may be applied to compensate for distance determination disturbances such as antenna delays.

According to an exemplary embodiment, the present disclosure may be based on the idea that a robust and reliable distance determination in a UWB communication system may be enabled, when an angle of arrival of an incoming UWB communication signal is determined and applied to compensate for distance determination disturbances, when performing the distance determination. Such a compensation for e.g. non-ideal angle-dependent antenna group delays may improve UWB distance estimation and may be achieved with low computational complexity, thus it may also be suitable for devices with little computing power (like tags) and does not add significantly to the overall power consumption. This compensation may be especially interesting for use cases that require highly accurate distance or position estimates.

Conventionally, such distance determination disturbances are essentially not compensated. Nevertheless, these disturbances may be compensated to reduce distance measurement errors, and therefore positioning errors. Angle of arrival measurements are so far merely used to determine the orientation of a device. However, the present disclosure describes for the first time to apply the angle of arrival determination for error compensation during UWB distance determination.

It is described an antenna imperfection and delay compensation method to improve distance estimation in a UWB system performing e.g. a time of arrival based message exchange. UWB antennas may exhibit different group delays depending on the angle-of-arrival of the incoming signal. Hence, by determining the angle of arrival of the received signal, an angle-dependent compensation may be applied that improves the resulting distance determinations.

DESCRIPTION OF EXEMPLARY EMBODIMENTS

In the following, further exemplary embodiments of the device, the system, the method and the use will be explained.

According to an exemplary embodiment, the distance determination disturbance comprises at least one of an antenna imperfection, an antenna delay, an angle-dependent delay, an angle-dependent group delay. Thereby, common disturbances may be overcome, so that especially accurate distance determination is enabled.

According to a further exemplary embodiment, the UWB communication device is configured to determine the distance based on a time-based distance measurement, in particular time of flight, ToF, and/or time difference of arrival, TDoA. Thus, established and standardized UWB methods can be directly applied.

In the context of this document, the term "time-based distance measurement" may refer to a measurement that is related to a time point, when a signal arrives (at a receiver) with respect to a transmission time. Hereby, the term time-based distance measurement may be a general expression, while the terms ToA, ToF and TDoA may refer to specific implementations. The term ToA (time of arrival) may refer to a raw measurement, which determines the time at which a signal is received according to the local clock of a device (time stamp at which the signal is received). Then, based on the received and transmitted timestamps of two or more messages (two-way ranging), a device can determine the time of flight (distance) between two devices (using a calculation). TDoA, instead, may refer to the difference of two received timestamps (ToAs), which gives a distance difference. Using a few distance differences, the location of a device can be determined (e.g. using a hyperbolic solver).

In an example, the UWB communication device transmits a UWB signal to a further UWB communication device, the further UWB communication device receives the signals and sends back a (further) UWB signal (two way). In another example, only the further UWB signal sends a UWB signal to the UWB communication device (one way). In yet another example, the UWB communication device transmits a UWB signal to a further UWB communication device and the further UWB communication device send back distance-related information back to the UWB communication device via an out-of-band channel.

According to a further exemplary embodiment, the UWB communication device further comprises a further antenna configured to receive a further UWB signal from the further UWB communication device or another UWB communication device (multiple antenna device). The control device is further configured to determine the angle of arrival by applying a phase difference of arrival, PDoA, angle determination based on the phases of the UWB signal and the further UWB signal. Therefore, the angle of arrival may be determined in a robust and reliable manner.

In general, angle of arrival measurements measure a time delay between signals arriving at the different antennas. Using the propagation velocity of the electromagnetic wave and the measured delay, the distance $\Delta 1$ can be calculated. Together with the known distance L between the antennas, one can calculate the angle of arrival of the incident signal. However, this result may be ambiguous because of the symmetry around the antenna axis (see FIG. 2). To resolve this ambiguity and to allow three-dimensional angle of arrival determination, more antennas, and a different antenna axis may be needed. An especially efficient angle determination method may be phase difference of arrival (PDoA).

The difference between ToF-AoA, TDoA-AoA and PDoA-AoA may be the way to derive the time delay between the signals arriving at the antennas. On the one hand, time of flight (ToF) and time difference of arrival (TDoA) methods use timestamps from rangings (distance determinations) to estimate the delay.

PDoA methods, on the other hand, compare the carrier phases of the incident signals. Knowing the carrier frequency, this phase difference can again be used to calculate a time delay. This approach may result in a higher accuracy of the angle estimate, for the same distance L between the antennas. To prevent additional ambiguity, the distance between the antennas may be preferably smaller than half the wavelength, which is often the case due to space and integration requirements. This may also mean that, for identical antennas, the incident signal will be impacted by a very similar antenna pattern and group delay for all antennas (assuming that the antenna array is well designed to minimize the coupling between the antenna elements).

According to a further exemplary embodiment of the UWB communication system, the further antenna is configured to receive a further UWB signal from the UWB communication device or another UWB communication device. In particular, the further UWB communication device may comprise a further control unit configured to determine a further angle of arrival based on the further received UWB signal. The control unit and/or the further control unit is configured to: apply a PDoA angle determination based on the UWB signal and the further UWB signal.

According to a further exemplary embodiment, the UWB communication device further comprises a device internal measurement device, in particular an inertial measurement unit, configured to measure an information indicative of the orientation of the UWB communication device (in particular based on the earth magnetic field). The control device is further configured to determine the angle of arrival using the information indicative of the orientation. The device internal measurement system may be already implemented in the UWB communication device. Thus, no additional costs and efforts are needed. The measured orientation may be advantageously taken into account, when determining the angle of arrival. Further, the information indicative of the orientation may be transmitted to the further UWB (anchor) communication device, e.g. via UWB or out-of band.

According to a further exemplary embodiment, the control device is further configured to estimate (coarse estimate) the spatial position of the UWB communication device based on the received UWB signal, in particular using a time-based distance measurement. Since the UWB communication device may already be equipped to perform a spatial position estimation (using a time-based distance measurement), no additional costs/efforts may be necessary. The measured spatial position may be advantageously taken into account, when determining the angle of arrival.

According to a further exemplary embodiment, the control device is further configured to determine the angle of arrival based on a combination of the information indicative of the orientation and the estimated spatial position of the UWB communication device. In this manner, the results of the above described measurements may be combined in order to obtain an especially accurate angle of arrival determination.

In a specific example of such a configuration, a plurality of anchor devices (further UWB communication devices) may be configured to estimate the position of a mobile device (UWB communication device) which is composed of a UWB-System and an IMU-System that are connected with each other (see also FIG. 3). The IMU system may be configured to measure the orientation of the device compared to a reference coordinate system (e.g. the magnetic field of the earth). By transmitting this IMU (orientation) information to the anchor system, e.g., during the UWB ranging exchange or using an out-of-band channel, the anchor system may become aware of the orientation of the mobile device. Based on a non-compensated distance estimate, the anchor system may be enabled to estimate a coarse mobile device position. By combining this coarse position estimate with the mobile device orientation, measured by the IMU-system, the anchor devices may estimate a coarse azimuth and elevation angle between the mobile device antenna and the antennas of the anchor devices.

This concept may be applied regardless of whether the position of a device (node) is estimated on the mobile device (node) or on the anchor device (node). Preferably, information (like IMU, TDoA/ToF) may be shared with the device that runs the delay compensated positioning algorithm. For instance, if the positioning shall be done on the mobile device (node), there is no IMU data exchange needed, because the device node already comprises the TDoA/ToF information. The data exchange between UWB communication device and further UWB communication device may be done in-band (UWB channel) or out-of-band (other channel), depending on the use case.

In a specific example, the orientation of the UWB communication device may be measured, followed by ToF/TDoA measurements to estimate the spatial position of the mobile device (node). The order of these two steps can be also swapped or combined in a single step. After the measurement data has been collected, a coarse position estimate of the UWB communication device may be obtained using a positioning algorithm. By knowing this rough position estimate and combining it with the measured orientation of the UWB communication device, the incoming angle (AoA) of all the UWB signals transmitted by the anchor devices may be calculated and used for compensating angle-dependent antenna delays.

The described scheme may be used independent from the ranging (distance determination) methods such as TDoA, SS-TWR, DS-TWR, etc. Additionally, analogous to how the AoA on the node side is estimated, also the AoA at the anchor side may be estimated and considered for improving the positioning estimate.

According to a further exemplary embodiment, the angle of arrival determination comprises a regulation loop (see for example FIG. 4). The quality of the determination may be further improved when position and/or orientation estimates are compared to a threshold value. Only, if (at least two) estimates show a difference below the threshold, the accuracy may be acceptable.

Referring to the example described above, a more accurate position estimate may be made and then used to improve the IMU and position-based AoA estimate. In turn, this AoA estimate may be used again for estimating the device position more accurately. This iterative flow of estimating the position, the AoA, and compensating for the antenna design can be repeated theoretically for an infinite number of times, out of that reason an abort criterion needs to be established.

For example, there are two abort criteria, the first one depends on the iteration counter that is increased after each iteration. Once this iteration counter reaches the maximum number of iterations, the algorithm stops. The second abort criteria is based on the relative position change between the iterations, once the difference in the position change between the current position estimate and the previous one is below a given threshold the algorithm can also abort since a further iteration would not lead to a significant change in the position estimate.

According to a further exemplary embodiment, the UWB communication device is at least one of the group which consists of a mobile device, a mobile phone, a transceiver, a circuit, a tag, a key, a token, a smart card. In an example, the described angle of arrival based compensation may be implemented in a feasible and cost-efficient manner into a plurality of economically interesting UWB applications.

According to a further exemplary embodiment of the UWB communication system, the UWB communication device is a mobile device, and/or the further UWB communication device is a static device, e.g. an anchor device, in particular attached to a target device.

In the context of the present document, the term "anchor device" may refer to any electric device that can be associated (e.g. arranged at or coupled to) with a target device and that may communicate with a mobile device via UWB. An anchor device may also be termed e.g. a beacon, a node, or a marker. An anchor device may be a unidirectional or a bidirectional communication device.

According to a further exemplary embodiment, the UWB communication system further comprises a plurality of anchor devices forming a UWB anchor system. Such a configuration (see e.g. FIG. 3) may be common to a UWB architecture. The plurality of anchor devices may improve the distance determination quality. However, due to the number of UWB signals, determination disturbances, in particular angle-dependent group delays, may be added one to another. Especially in this situation, an angle of arrival compensation may be highly advantageously.

In line-of-sight conditions, a determination disturbance such as the antenna group delay introduces a bias $\delta(\alpha,\beta)$ in the time of flight estimates $\tau^\hat{}$ that depends on the azimuth ($\alpha$) and elevation ($\beta$) angle of the incoming signal:

$$\tau^\hat{}=\tau+\delta(\alpha,\beta)$$

where $\tau$ is the true time of flight between the two devices performing the ranging exchange. As a result, distance estimates $d'=\tau^\hat{}\times c$ will suffer from an error $\varepsilon$ due to the angle-dependent antenna group delay as follows:

$$\varepsilon=d'-d=\delta(\alpha,\beta)\times c$$

Given the known antenna group delay, measured in a pre-characterization phase of the device, one may apply a correction factor to the ranging distance estimates if $\alpha,\beta$ are measured at the receiving device. This method may be computationally inexpensive and may merely require a table to store the corresponding compensation values for all angles of interest. This means it can also run on a low-power/low-cost system such as a mobile phone or a car key.

The aspects defined above and further aspects of the present disclosure are apparent from the examples of embodiment to be described hereinafter and are explained with reference to these examples of embodiment. The disclosure will be described in more detail hereinafter with reference to examples of embodiment but to which the disclosure is not limited.

BRIEF DESCRIPTION OF THE DRAWINGS

The illustrations in the drawings are schematic. In different drawings, similar or identical elements are provided with the same reference signs.

DESCRIPTION OF THE DRAWINGS

Figure 1:
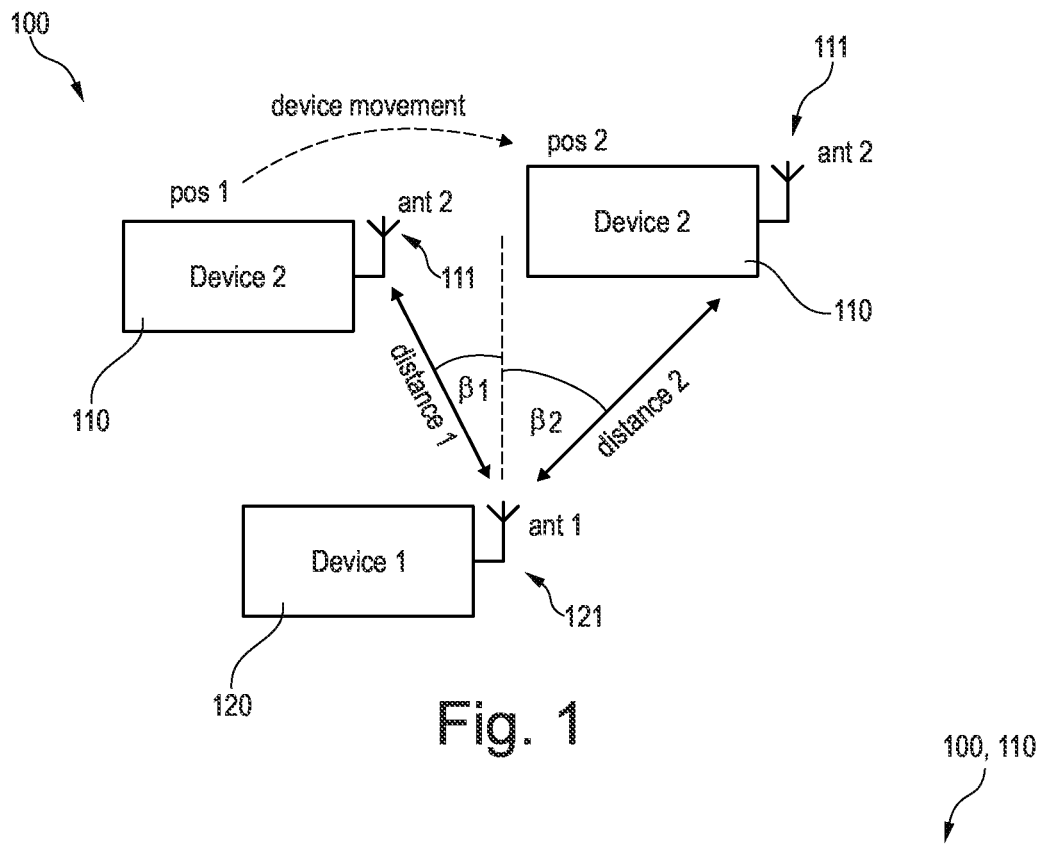
FIG. 1 illustrates a UWB communication system according to an exemplary embodiment of the present disclosure.

Before, referring to the drawings, exemplary embodiments will be described in further detail, some basic considerations will be summarized based on which exemplary embodiments of the present disclosure have been developed.

According to exemplary embodiments of the present disclosure, there is described a method to compensate for the angle-dependent antenna group delay in a UWB-equipped device that includes either a UWB transceiver system that is able to estimate the angle of arrival (AoA) of the incoming signal or a UWB system that comprises an inertial measurement unit (IMU) for estimating its relative orientation and thus also the incoming angle of the signal. i) In case of a two-antenna based transceiver system, the AoA can be estimated based on the phase-difference of arrival (PDoA) of the signal received at the two receiver antennas and then mapped to the relative azimuth and elevation of the transmitter with respect to the coordinate system of the receiver device. ii) In case of a UWB transceiver system including an IMU, the coarse position estimate of the transceiver can be combined with the known device orientation for estimating the azimuth and elevation AoA of the incoming signal. Given these AoA estimates and known angle-dependent antenna group delays for each channel, obtained from an antenna characterization experimental campaign, an azimuth and elevation based antenna delay compensation can be applied that results in more accurate distance estimates.

According to exemplary embodiments of the present disclosure, the described method can be applied in any UWB system that performs ranging (distance determination) and is able to estimate the angle of arrival (AoA) of the incoming signal, e.g. either using a multi-antenna system or an IMU. The described method can for example be used in the following applications:

Indoor/outdoor navigation systems using UWB ranging.
Indoor/outdoor tracking systems using ranging schemes.
Mobile systems that measure the distance between users, e.g., for social distancing.
Mobile systems to find a user distance or relative position w.r.t. a UWB-equipped object, e.g., smart tags or when using a UWB-equipped smartphone as a controller for IoT devices.
Automotive smart access systems.

FIG. 1 illustrates a UWB communication system 100 according to an exemplary embodiment of the disclosure. The UWB communication system 100 comprises a UWB communication device 110 with a first antenna 111 and a further UWB communication device 120 with a further antenna 121. In this example, the UWB communication device 110 is a mobile device such as a mobile phone or tag, while the further UWB communication device 120 is a stationary device, for example an anchor device attached to a target device. A UWB communication signal can be transferred between the antenna 111 of the UWB communication device 110 and the further antenna 121 of the further UWB communication device 120. In this example, both directions are possible. The UWB communication device 110 comprises a control unit (e.g. an IC, not shown) configured to determine a distance between the UWB communication device 110 and the further UWB communication device 120. The distance determination is based on a time of arrival measurement of the UWB signal transferred between the UWB communication device 100 and the further UWB communication device 120.

In this example, device 1 (further UWB communication device 120) uses a non-ideal antenna ant1 (further antenna 121) for UWB communication and distance estimation. Device 2 (UWB communication device 110) uses an ideal antenna ant2 (antenna 111) for UWB communication. Using a two-way ranging (TWR) exchange, a common ranging-based distance estimation technique, the devices 110, 120 can determine the distance between them. While the position of device 1 is static, device 2 changes its position. At pos1 of device 2, device 1 receives the UWB signal emitted by device 2 with the signal angle of arrival $\beta 1$. When device 2 is at pos2, device 1 receives the UWB signal with the signal angle of arrival $\beta 2$. If device 2 is at pos1, the physical distance between the devices is distance 1, while at pos2, the physical distance is distance 2. Since device 1 uses a non-ideal antenna, the antenna delay is a function of the incoming signal angle called f_antenna_delay($\beta$), where $\beta$ is the incoming signal angle compared to the antenna reference axis shown as a dashed line in FIG. 1. Since device 1 uses a non-ideal antenna whose delay depends on the angle of the incoming signal, the position of device 2 with respect to the position of device 1 changes the direction of the signal, thereby affecting the distance determination (distance determination disturbance).

This issue is solved in the present disclosure by i) determining an angle of arrival $\beta$ based on a received UWB signal, and ii) determining the distance between the UWB communication device 110 and the further UWB communication device 120, while compensating for a distance determination disturbance such as an (angle-dependent) delay and an antenna imperfection, using the determined angle(s) of arrival $\beta 1$, $\beta 2$.

Figure 2:
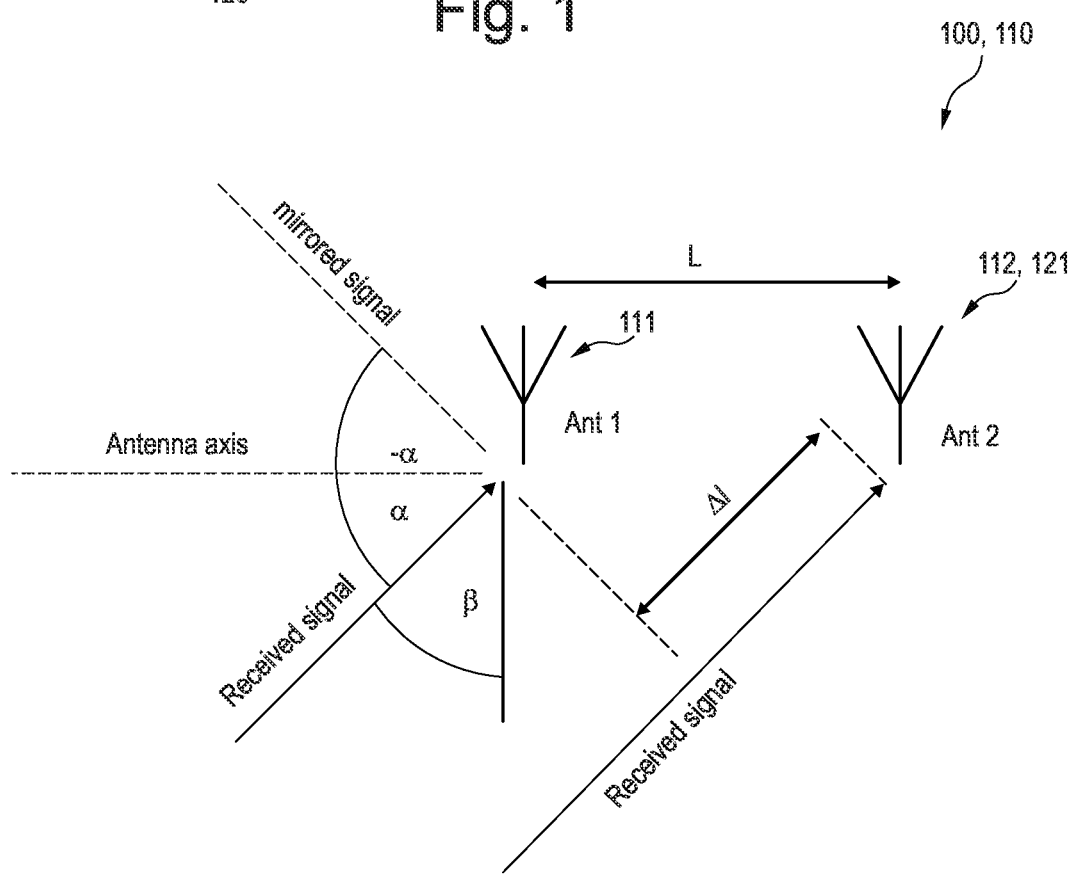
FIG. 2 illustrates a UWB communication device using a phase difference of arrival measurement according to an exemplary embodiment of the present disclosure.

FIG. 2 illustrates a UWB communication device 110 or a UWB communication system 100 using a phase difference of arrival measurement according to an exemplary embodiment of the present disclosure. In particular, there are applied at least two antennas, each receiving an incoming UWB signal. While the distance L between the two antennas is known, a distance $\Delta 1$ is calculated based on the phases of a received UWB signal and a received further UWB signal.

According to a first option, there is provided a UWB communication device 110 with multiple antennas. Thus, the UWB communication device 110 comprises a further antenna 112 configured to receive the further UWB signal from the further UWB communication device 120 or another UWB communication device 130. The control device of the UWB communication device 110 is configured to apply a phase difference of arrival, PDoA, angle determination based on the UWB signal and the further UWB signal.

According to a second option, there is provided a UWB communication system 100 with the UWB communication device 110 comprising the antenna 111 and the further UWB communication device 120 comprising the further antenna 121. The further antenna 112 is configured to receive a further UWB signal from another UWB communication device 130. The control unit and/or the further control unit is configured to apply a PDoA angle determination based on the UWB signal and the further UWB signal.

Figure 3:
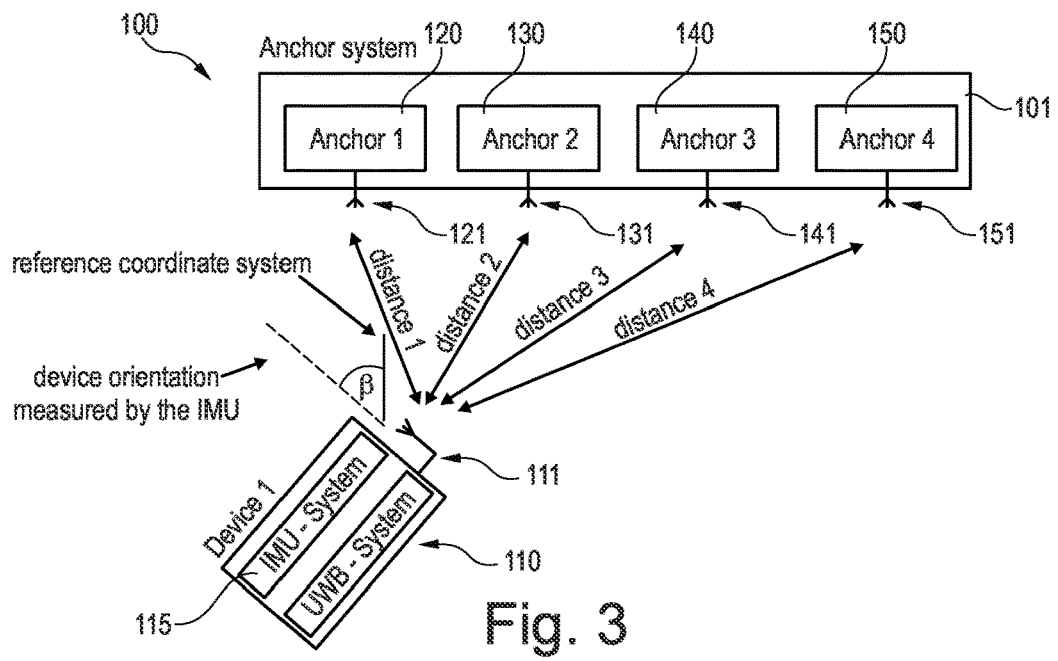
FIG. 3 illustrates a UWB communication system using an inertial measurement unit according to an exemplary embodiment of the present disclosure.

FIG. 3 illustrates a UWB communication system 100 using an inertial measurement unit according to an exemplary embodiment of the present disclosure. The UWB communication system 100 comprises the UWB communication device 110 (here device 1) comprising a device internal measurement device, being an inertial measurement unit 115, coupled to the UWB system (control unit). Said unit 115 is configured to measure an information indicative of the orientation of the UWB communication device 110, for example based on the earth magnetic field. The UWB communication system 100 further comprises an anchor system 101 containing four anchor devices 120 130, 140, 150. Each anchor device comprises a respective UWB antenna 121, 131, 141, 151. UWB signals are transmitted between the UWB communication device 110 and the respective anchor devices 120, 130, 140, 150, in this example in both directions.

Based on the time of arrival of these UWB signals, distances can be estimated. The control device of the UWB communication device 110 is configured to estimate the spatial position of the UWB communication device 110 based on the received UWB signals using a ToA measurement method. The control device (or a further control device of one of the anchor devices) is further configured to determine the angle of arrival $\beta$ based on a combination of the information indicative of the orientation and the estimated spatial position of the UWB communication device 110. The information indicative of the orientation of the UWB communication device 110 can be transferred to the anchor devices by UWB communication or by an out-of-band channel.

Figure 4:
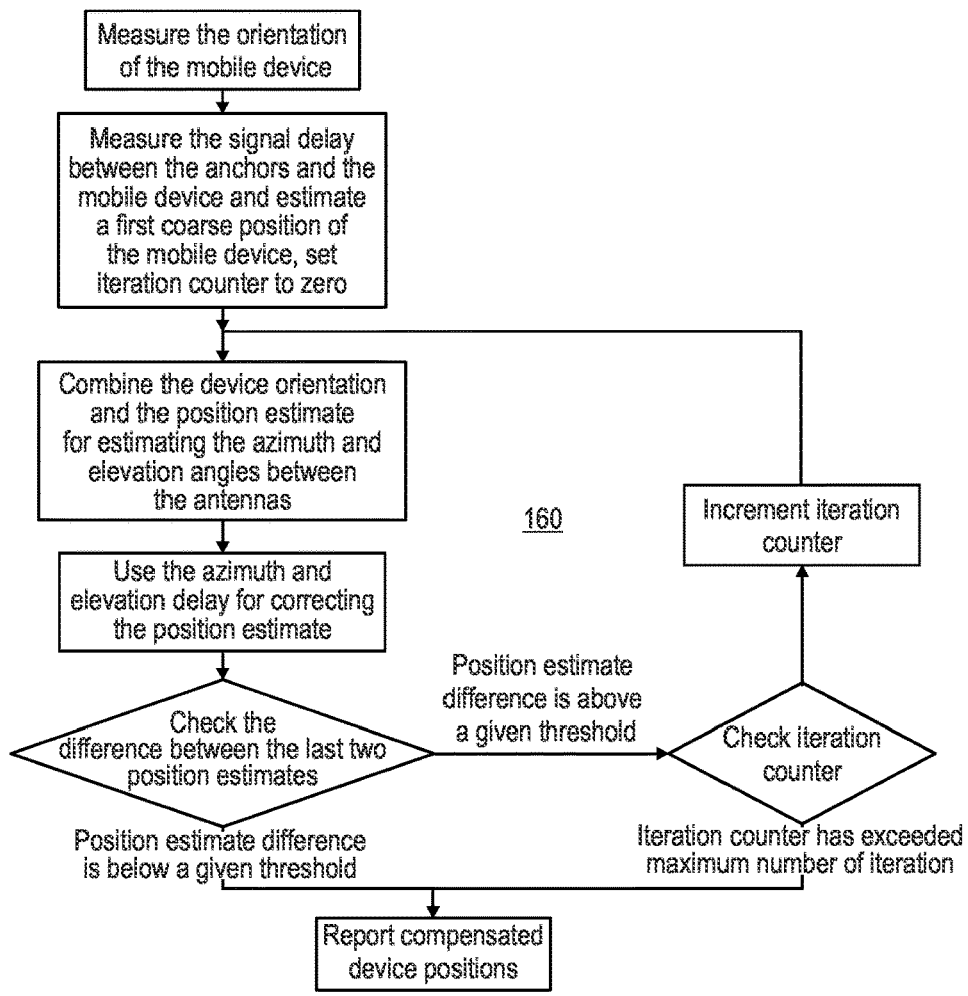
FIG. 4 illustrates a UWB communication device using a regulation loop according to an exemplary embodiment of the present disclosure.

FIG. 4 illustrates a UWB communication device 110 using a regulation loop 160 according to an exemplary embodiment of the present disclosure. The UWB communication device 110 applies the IMU unit 115 based angle of arrival determination described in FIG. 3 above. In order to improve the angle determination, a feedback loop is implemented. The difference between the last two position estimates (based on the orientation and the coarse position estimate of the UWB communication device) is compared to a predefined threshold. If the position estimate difference is below the threshold, the compensated device position can be further applied (report compensated device position). If the position estimate is, however, above the threshold, a counter is incremented, and a further regulation round is performed.

In this specification, embodiments have been presented in terms of a selected set of details. However, a person of ordinary skill in the art would understand that many other embodiments may be practiced which include a different selected set of these details. It is intended that the following claims cover all possible embodiments.

REFERENCE NUMERALS

100 UWB communication system
101 Anchor system
110 UWB communication device
111 Antenna
112 Further antenna (same device)
120 Further UWB communication device
121 Further antenna
130 Other device, anchor device
140, 150 Anchor devices
131, 141, 151 Antennas
160 Regulating loop

The invention claimed is:

1. A first ultra-wide band, UWB, communication device comprising:
 a first UWB antenna, configured to receive a first UWB signal from a second UWB communication device;
 a second UWB antenna configured to receive a second UWB signal from the second UWB communication device; and a first control device, configured to apply a phase difference of arrival, PDoA, angle determination to determine an angle of arrival based on the received first UWB signal and the second UWB signal, determine a distance between the first UWB communication device and the second UWB communication device, and correct the distance for a distance determination disturbance using the determined angle of arrival.

2. The first UWB communication device according to claim 1, wherein the distance determination disturbance comprises at least one of an angle-dependent delay and an angle-dependent group delay.

3. The first UWB communication device according to claim 1, wherein the first UWB communication device is configured to determine the distance based on a time-based distance measurement.

4. The first UWB communication device according to claim 3, wherein the time-based distance measurement comprises at least one of time of flight, ToF, and time difference of arrival.

5. The first UWB communication device according to claim 1, wherein the first UWB communication device is at least one of the group which consists of a mobile device, a mobile phone, a transceiver, a circuit, a tag, a key, a token, and a smart card.

6. The first UWB communication device of claim 1, wherein the first UWB communication device and the second UWB communication device are implemented in a UWB communication system, wherein the second UWB communication device comprises a third UWB antenna.

7. The first UWB communication device of claim 6, wherein the first UWB communication device is a mobile device, and wherein the second UWB communication device is an anchor device.

8. The first UWB communication device of claim 7, wherein the anchor device is attached to a target device.

9. The first UWB communication device of claim 6, further comprising:
a plurality of anchor devices forming a UWB anchor system.

10. A first UWB communication device comprising:
a first UWB antenna configured to receive a first UWB signal from a second antenna of a second UWB communication device;
a device internal measurement device configured to measure a device orientation of the first UWB communication device; and
a control device configured to
determine a position estimate of the first UWB device,
after determining the position estimate, determine an angle of arrival based on the received first UWB signal, wherein the angle of arrival determination comprises a regulation loop that includes
a first step of combining the device orientation and the position estimate to produce estimates of the azimuth and elevation angles between the first and second UWB antennas,
a second step of using the estimates of the azimuth and the elevation angles to correct the position estimate, resulting in a corrected position estimate, and
a third step of determining whether a difference between the position estimate and the corrected position estimate is above or below a threshold,
wherein, when the difference is above the threshold, repeating the first, second, and third steps using the corrected position estimate as the position estimate, and
when the difference is below the threshold, identifying the corrected position estimate as a compensated device position of the first UWB device.

11. The first UWB communication device according to claim 10, wherein the device internal measurement device is an inertial measurement unit.

12. The first UWB communication device according to claim 10, wherein the first control device is further configured to determine the position estimate of the first UWB communication device based on the received first UWB signal.

13. A method of determining a distance in a UWB communication system of a first UWB communication device with a first antenna and a second UWB communication device with a second antenna and a third antenna, the method comprising:
transmitting a first UWB signal between the first UWB communication device and the second UWB communication device, wherein the first UWB signal is received at the second and third antennas with a phase difference of arrival;
determining, by the first UWB communication device, an angle of arrival based on the transmitted first UWB signal and the phase difference of arrival;
determining a distance between the first UWB communication device and the second UWB communication device; and
correct the distance for a distance determination disturbance using the determined angle of arrival.

* * * * *